(No Model.)
W. E. CARR.
APPARATUS TO FACILITATE THE TEACHING OF NOTATION AND NUMERATION.
No. 384,959. Patented June 26, 1888.
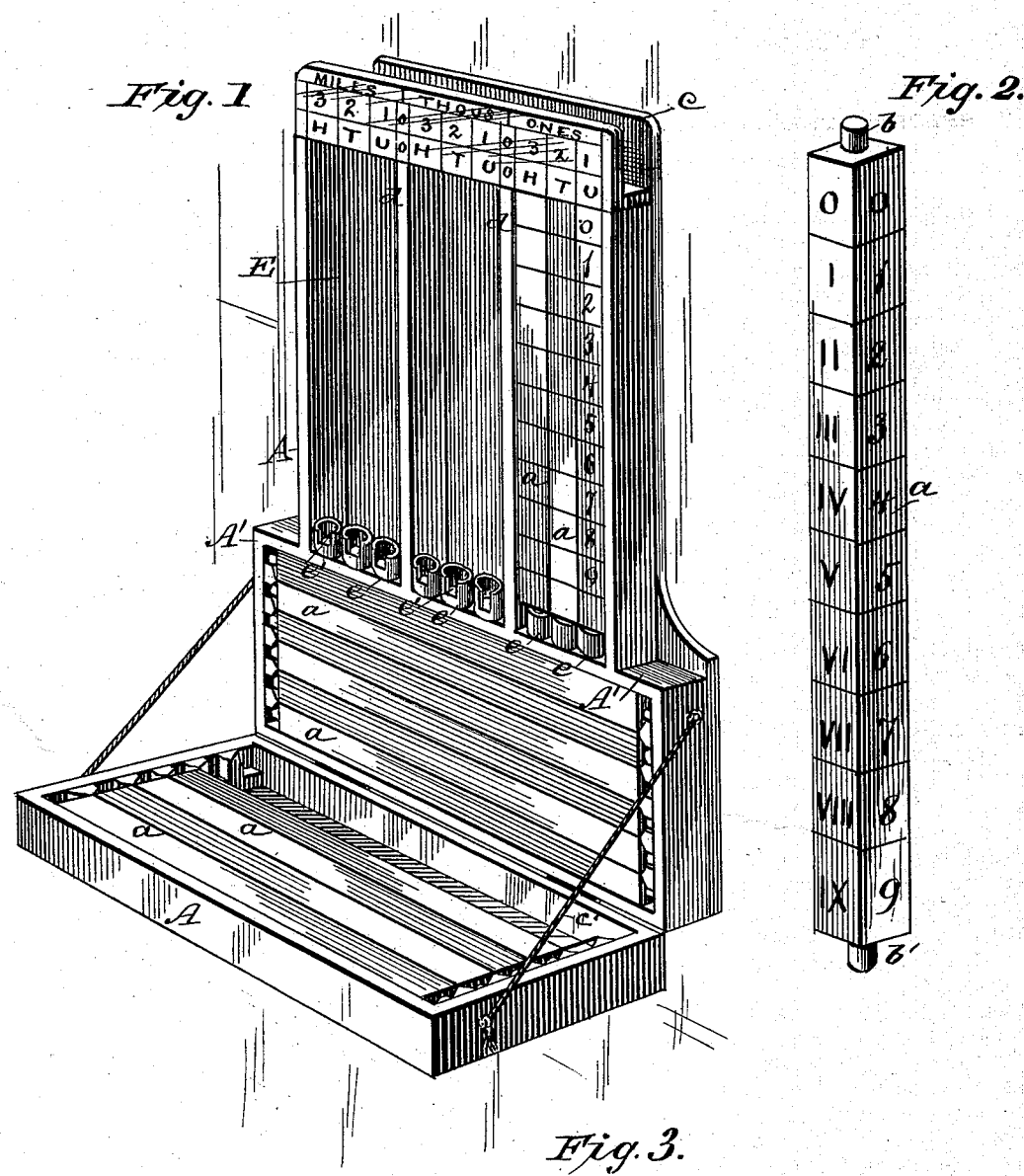

UNITED STATES PATENT OFFICE.

WILLIAM E. CARR, OF CARBON, INDIANA.

APPARATUS TO FACILITATE THE TEACHING OF NOTATION AND NUMERATION.

SPECIFICATION forming part of Letters Patent No. 384,959, dated June 26, 1888.

Application filed July 31, 1886. Serial No. 209,652. (No model.)

*To all whom it may concern:*

Be it known that I, WILLIAM E. CARR, a citizen of the United States, residing at Carbon, in the county of Clay and State of Indiana, have invented a new and useful Improvement in Apparatus (Numerical Tablets) to Facilitate the Teaching of Notation and Numeration, of which the following is a specification.

My invention relates to a new and useful improvement in a numeral apparatus designed to facilitate the teaching of notation and numeration, combining in a case, frame, and tablets a simple device for illustrating the development of the whole Arabic system of notation by successive decimal series, the principles underlying the Roman system, a comparison of the two systems, and providing a convenient substitute for the blackboard in presenting exercises in numeration. I attain these objects by means of the peculiar construction and adjustable arrangement of the various parts of my apparatus and the inscriptions thereon, which will be more fully pointed out and described in the specification and claims, reference being had to the drawings accompanying this application and forming part of the same.

Figure 1 is a perspective view of my invention. Fig. 2 is a perspective view of one of the columns. Fig. 3 is a detail view.

Similar letters refer to like parts throughout the drawings.

Referring to the drawings, A represents the front part of a case, constructed of any suitable material, (preferably of wood,) of the proper size and form to constitute the lid of the case or box or separate rack, as may be desired.

A' is the lower part of the case, solidly attached to the frame E, and provided with racks for holding the tablets when not in use. The upper frame, E, is divided into vertical sections by the partitions $d\ d$, as many sections being used as may be desired, each section representing a numeral period and adapted to receive the columns or tablets $a\ a\ a$. The base of each section is provided with revolving base-blocks $e$, with side slots, $e'$, and held in place by the vertical set-screws $e^2$, the said blocks being designed to receive the rounded projections $b'$ of the tablets $a$, and to hold the tablets in place, the blocks being partly revolved for that purpose after the projection $b'$ is placed therein. The frame E is surmounted by a head-board, C, on which are shown, in printed or painted characters, the names and numbers of the periods and orders involved. The tablets or columns $a\ a\ a$ are fitted to enter in the several sections of the frame E, and have printed or painted on their several sides letters or characters, so that being arranged singly or in series, interchangeably at pleasure, their outer faces will present any desired numerical combination.

As a further and more particular specification, I say that the tablets $a\ a\ a$ are four-faced columns, having printed or painted on the several faces thereof the Arabic and Roman numeral characters. The columns are adjustable and interchangeable. No two of the several faces contain the same figures or characters in the same order. My system and the apparatus for its illustration are constructed upon the fact that in the Arabic system the figures 0, 1, 2, 3, 4, 5, 6, 7, 8, and 9 represent the first ten numbers in the decimal system, and also the terminal figures of the next ten numbers and of every succeeding decimal series to infinity. These figures are placed in vertical columns in the order above indicated, and thereby any number or any decimal series higher than 9 can be exhibited by prefixing one or more columns of ten figures each, all the figures of each column so prefixed being the same—that is, all 1's, or all 2's, or all 3's, &c. Thus any number from 1 to 999,999,999 may be set up, using one face of a tablet containing the column of figures from 0 to 9, eight columns of 1's, eight of 2's, eight of 3's, eight of 4's, eight of 5's, eight of 6's, eight of 7's, eight of 8's, eight of 9's, and seven of 0's, making eighty columns, all placed upon twenty of the four-sided tablets. Not deeming it essential to set up every number, as stated, I provide for setting up only a part of the numbers within the range designated, leaving at intervals a hiatus for the exercise of the pupil's intelligence. A set of twelve tablets with forty-eight columns of figures on their forty-eight faces allows the use of the following columns: one column from 0 to 9, one from 1 to 9, four 0's, four of 1's, four of 2's, four of 3's, three of 4's, three of 5's, three of 6's, three of 7's, three of 8's, three of 9's, four miscellaneous, and eight for Roman numerals. Having the column 0 to 9 in place on the right, all the numbers to 99 may be shown in decimal series by prefixing successively columns of 1's, 2's, 3's, &c. A column of 0's being set in the second place, a column of 1's prefixed, (in third place,) all the numbers may be set up from 100 to 109. By substituting a column of 1's for the column of 0's, we have all the numbers from 110 to 119. By adjusting or substituting tablets in the first three places all the numbers may be set up from 1 to 999, showing in the process the development of the Arabic system by an invariable decimal ratio.

By my apparatus the Arabic and Roman systems are compared by placing the tablets containing their respective numerals side by side or in contrast, showing that in the Arabic system the changing of a figure one place to the right or left its value is decreased or increased in a constant ratio of ten, that its value depends upon its place in relation to the initial or unit place, and that its value in any specified plate is always the same without regard to figures prefixed or suffixed, while it is shown that by the construction of the Roman system a numeral prefixed or suffixed may change the value by an irregular and altogether arbitrary ratio, or by an irregular and arbitrary addition or subtraction.

Having described and explained my invention, I claim, and desire to secure by Letters Patent, the following:

1. In an apparatus for facilitating the teaching of notation and numeration, the frame E, divided into sections, as shown, and adapted to receive and display the tablets $a\ a\ a$, in combination with the rotary base-blocks $e$, having slots $e'$, and set screws $e^2$, substantially as shown and described.

2. In an apparatus for facilitating the teaching of notation and numeration, the frame E, having head-board C, provided with inscriptions thereon, in combination with the tablets $a\ a\ a$, having letters and figures thereon, the rotary base-blocks $e$, having slots $e'$, and set-screws $e^2$, all arranged and operated substantially as shown and described.

WM. E. CARR.

Witnesses:
   W. S. ODELL,
   DANIEL BREED.

It is hereby certified that in Letters Patent No. 384,959, granted June 26, 1888, upon the application of William E. Carr, of Carbon, Indiana, for an improvement in "Apparatus to Facilitate the Teaching of Notation and Numeration," an error appears in the printed specification requiring correction, as follows: In line 24, page 2, the word "plate" should read *place;* and that the said Letters Patent should be read with this correction therein that the same may conform to the record of the case in the Patent Office.

Signed, countersigned, and sealed this 1st day of October, A. D. 1889.

[SEAL.]
                                        CYRUS BUSSEY,
                                   *Assistant Secretary of the Interior.*

Countersigned:
    C. E. MITCHELL,
        *Commissioner of Patents.*